United States Patent [19]

Gardner-Chavis et al.

[11] Patent Number: 5,171,554
[45] Date of Patent: Dec. 15, 1992

[54] CONVERSION OF FORMALDEHYDE AND NITROGEN TO A GASEOUS PRODUCT AND USE OF GASEOUS PRODUCT IN REDUCTION OF NITROGEN OXIDE IN EFFLUENT GASES

[75] Inventors: Ralph A. Gardner-Chavis, Cleveland; Michael P. May, Canton, both of Ohio

[73] Assignee: Molecular Technology Corporation, Canton, Ohio

[21] Appl. No.: 738,533

[22] Filed: Jul. 31, 1991

Related U.S. Application Data

[63] Continuation-in-part of Ser. No. 585,403, Sep. 20, 1990, abandoned.

[51] Int. Cl.$^5$ .......................... B01J 8/00; C01B 17/00; B01D 47/00
[52] U.S. Cl. .................................. 423/239; 423/212; 423/235
[58] Field of Search .................. 423/239, 239 A, 235, 423/235 D, 212

[56] References Cited

U.S. PATENT DOCUMENTS

| | | | |
|---|---|---|---|
| 3,746,498 | 7/1973 | Stengel | 431/4 |
| 3,867,507 | 2/1975 | Myerson | 423/212 |
| 3,900,554 | 8/1975 | Lyon | 423/235 |
| 4,199,554 | 4/1980 | Araki et al. | 423/239 |
| 4,208,386 | 6/1980 | Arand et al. | 423/235 |
| 4,221,768 | 9/1980 | Inoue et al. | 423/239 |
| 4,256,711 | 3/1981 | Sermon | 423/239 |
| 4,325,924 | 4/1982 | Arand | 423/235 |
| 4,335,084 | 6/1982 | Brogan | 423/235 |
| 4,350,669 | 9/1982 | Izumi et al. | 423/235 |
| 4,585,632 | 4/1986 | Schneider et al. | 423/239 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,746,498 | 5/1988 | Barczak et al. | 423/244 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 4,868,148 | 9/1989 | Henk et al. | 502/303 |

FOREIGN PATENT DOCUMENTS

| | | | |
|---|---|---|---|
| 654427 | 12/1962 | Canada | 423/235 |
| 326943 | 1/1989 | European Pat. Off. | |
| 2719417 | 4/1977 | Fed. Rep. of Germany | 53/34 |
| 5376968 | 7/1976 | Japan | 53/34 |
| 52-14619 | 2/1977 | Japan | 53/34 |
| 52-42461 | 4/1977 | Japan | 53/34 |
| 53-128023 | 11/1978 | Japan | 53/34 |
| 54-38268 | 3/1979 | Japan | 53/34 |
| 54-46172 | 4/1979 | Japan | 53/34 |
| 89-11821 | 5/1987 | Japan | |
| 1572118 | 4/1977 | United Kingdom | 53/34 |

OTHER PUBLICATIONS

"Reducing NO$_x$ Emissions", *Power*, Sep. 1988, pp. S-1 to S-13.

R. A. Perry and D. L. Siebers, *Nature*, vol. 324, 18-25 pp. 657-658.

T. Yano et al., "Behavior of Methanol and Formaldehyde in Burned Gas from Methanol Combustion, Effects of Nitric Oxide on Oxidation Reaction", Bulletin of the SME, vol. 26, No. 213, pp. 406-413, (Mar. 1983).

*Primary Examiner*—Gregory A. Heller
*Attorney, Agent, or Firm*—Renner, Otto, Boisselle & Sklar

[57] ABSTRACT

A method is described for converting formaldehyde to a gaseous product mixture capable of reacting with nitrogen oxide which comprises reacting formaldyhyde with nitrogen in the presence of a catalyst which is capable of promoting the reaction between formaldehyde and nitrogen at a temperature below about 1200° F. The gaseous product mixture obtained in this manner is effective in reducing the nitrogen oxide content of combustion gases by mixing the gaseous product mixture with the combustion gas at temperatures from ambient temperature up to about 2000° F.

28 Claims, 1 Drawing Sheet

CONVERSION OF FORMALDEHYDE AND NITROGEN TO A GASEOUS PRODUCT AND USE OF GASEOUS PRODUCT IN REDUCTION OF NITROGEN OXIDE IN EFFLUENT GASES

CROSS REFERENCE TO RELATED APPLICATIONS

This application is a continuation-in-part of copending application Ser. No. 07/585,403 filed on Sep. 20, 1990, now abandoned, which is hereby incorporated by reference.

FIELD OF THE INVENTION

The present invention relates to a catalytic reaction of formaldehyde and nitrogen to form a gaseous product, and to a method of reducing nitrogen oxide emissions and thereby reducing pollution of the atmosphere. More particularly, the present invention relates to the use of a gaseous product obtained by reacting formaldehyde and nitrogen for reducing the nitrogen oxide content of combustion gases.

BACKGROUND OF THE INVENTION

There has been considerable effort devoted in recent years to solve various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes in the ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annual $NO_x$ emissions while mobile sources such as automobiles and trucks are responsible for about 40% to about 50%. The types of air pollutants generated by such facilities include particulate emissions such as coal ash, sulphur compounds such as $SO_2$ and $SO_3$, carbon monoxide, ozone, and nitrogen oxides, commonly referred to collectively as "$NO_x$". One of the common components found in polluted air is nitrogen dioxide ($NO_2$) which is known to be an extremely poisonous material. Nitrogen dioxide is introduced into the atmosphere from the various sources such as commercial plants producing nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation"); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen from waste gases so that the gases may be discharged into the atmosphere without harm to the environment. Nitrous oxides emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gases by converting the nitrogen oxides to innocuous gases. Such chemical processes, however, generally require extremely high temperatures such as in the range of about 1600° to about 2000° F. and higher. The temperatures of some of these chemical reactions for reducing nitrogen oxide content have been reduced by utilizing catalysts which are effective in promoting the reduction of nitrogen oxide, but using a catalyst has certain disadvantages such as the expense of the catalyst, the life of the catalyst, the expense and difficulty of contacting the combustion effluents with the catalyst, etc. Accordingly, there has been continued emphasis on procedures for reducing nitrogen oxide emissions which do not involve the direct use of catalysts. Various techniques for reducing $NO_x$ emissions from various combustion processes are described in the article entitled "Reducing $NO_x$ Emissions," *Power* September 1988, pp S-1 to S-13.

Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,743,436; 4,849,192; and 4,851,201 describe processes utilizing ammonia to reduce nitrogen oxide emissions.

U.S. Pat. No. 3,867,507 describes a method for treating a stream of combustion effluents containing $NO_x$ and other contaminants wherein the stream is contacted initially with a hydrocarbon in the presence of oxygen to reduce the $NO_x$ to molecular nitrogen, and thereafter contacting the reduced stream with oxygen to oxidize all other contaminants to an oxidized state. The patentees indicate that any hydrocarbon, as well as oxygen-containing hydrocarbons, sulfur-containing hydrocarbons, nitrogen-containing hydrocarbons, etc. which yield carbon containing free radicals on pyrolysis can be used. Among the oxygenated hydrocarbons disclosed are alcohols, ethers, acids, ketones and aldehydes. A critical feature of the process is the ratio of total number of carbon atoms in the hydrocarbon per mole of $NO_x$. The number of carbons in the hydrocarbon may be from 1 to 12. The second critical feature is the $[O_2]/[C]$. The patentees further state that any carbon atoms bound to oxygen in the hydrocarbon compounds are not considered in the carbon-to-oxygen ratio, and this requirement excludes formaldehyde. Japanese Patent Publication No. 54-46172 describes the method for removing nitrogen oxide from waste combustion gases by adding alcohols or aldehydes to the combustion gas to reduce the nitrogen oxide at a gas-phase state in the presence of oxygen. The alcohols include methyl alcohol, ethyl alcohol, propyl alcohols and butyl alcohols. The aldehydes include formaldehyde, acid aldehyde, etc. The authors indicate that the reaction between the aldehyde or alcohol and the $NO_x$ in the gas can be conducted at temperatures of 200° C. to about 600° C., and more preferably, from about 400° C. to 600° C.

Canadian Patent 654,427 describes a process for removal of nitrogen oxides from $SO_2$ and/or $SO_3$-containing gases. The process involves spraying water containing reducing agents into the gases to be purified. Formaldehyde is disclosed as one example of a useful reducing agent. The patentees indicate that the process also is useful for removing nitrogen oxides from gases which do not contain $SO_2$ and/or $SO_3$, but in this case $SO_3$ is added to the gas while the gas is sprayed with dilute sulfuric acid containing reducing compounds.

Addition of oxygen-containing hydrocarbons (alcohols, aldehydes, ketones, acids, ethers, etc.) and/or their precursors for controlling nitrogen oxides in exhaust gases by conversion of NO to $NO_2$ is described in U.S. Pat. No. 4,350,669; U.K. Patent 1,572,118 and Japanese Patent Application Nos. 52-14619; 52-42461; 53-76968; 53-128023; and 54-38268. U.S. Pat. No. 4,350,669 describes methanol and formaldehyde as useful oxygen-containing hydrocarbons, and methane, ethane and propane as examples of hydrocarbons.

U.S. Pat. No. 4,256,711 describes catalysts for decomposing nitrogen oxides present in gas streams. The catalysts include the borides, carbides, nitrides and silicides of metals such as Ti, V, Zr, Hf, etc.

SUMMARY OF THE INVENTION

A method is described for converting formaldehyde to a gaseous product mixture capable of reacting with nitrogen oxide which comprises reacting formaldehyde with nitrogen in the presence of a catalyst capable of promoting the reaction at a temperature below about 1200° F. The gaseous product mixture obtained in this manner is effective in reducing the nitrogen oxide content of combustion gases by mixing the gaseous product mixture with the combustion gas at temperatures from ambient temperature up to about 2000° F.

DESCRIPTION OF THE PREFERRED EMBODIMENTS

Figure 1:
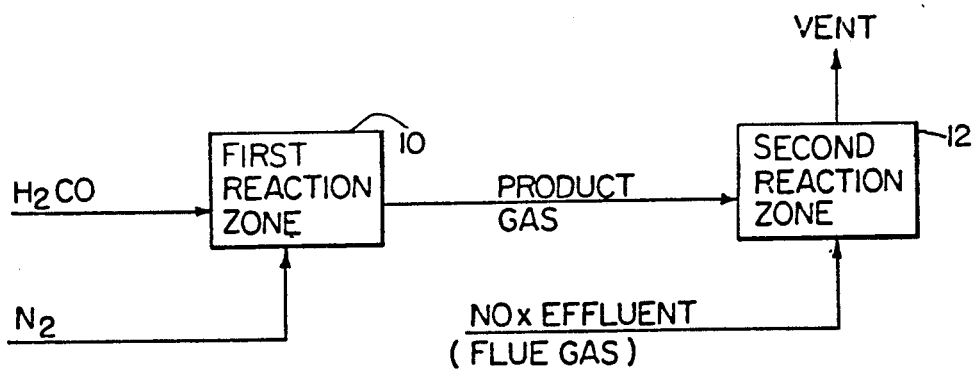
FIG. 1 is a schematic flow diagram of a combustion gas purification process in accordance with the process of the present invention.
Figure 2:
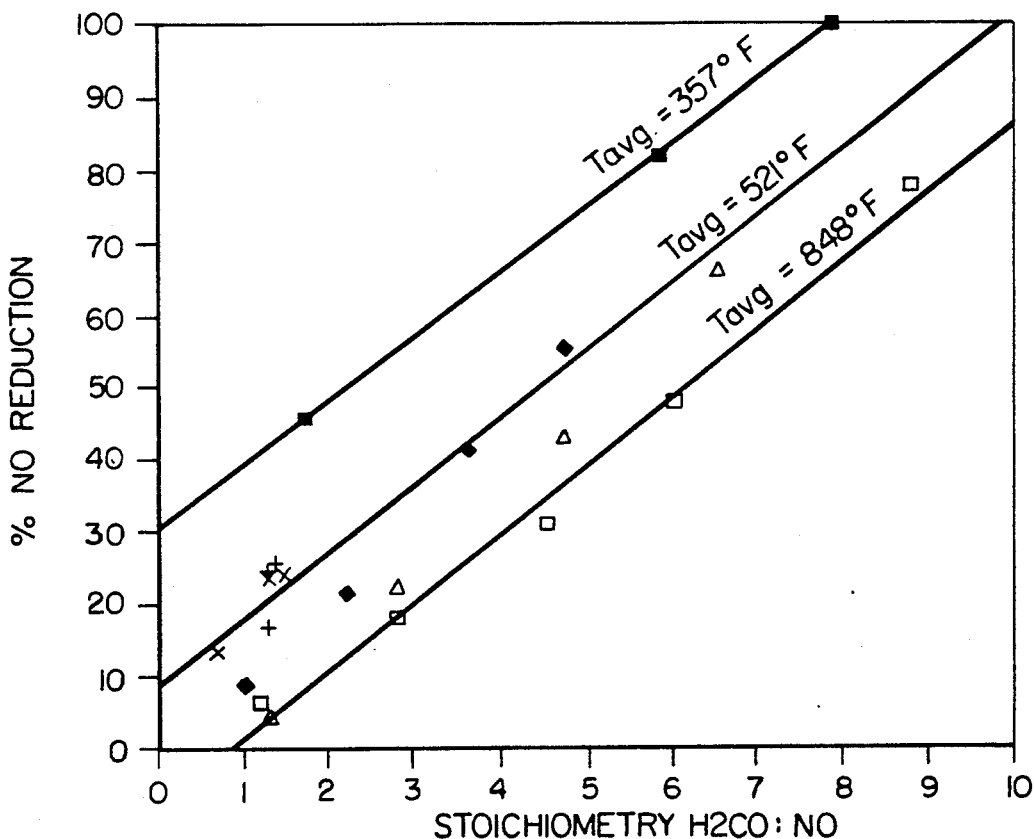
FIG. 2 is a graph of percent NO reduction versus molar ratio of formaldehyde to nitric oxide obtained in a diesel engine exhaust test.

Throughout the specification in claims, the terms "nitrogen oxide(s)" and "$NO_x$" are used in the generic sense to include the various nitrogen oxide compounds such as nitrous oxide ($N_2O$), nitric oxide (NO) and nitrogen dioxide ($NO_2$).

In a first embodiment, the present invention is a method for converting formaldehyde to a gaseous product mixture capable of reacting with nitrogen oxide. The process comprises reacting formaldehyde with nitrogen in the presence of a catalyst at a temperature from about 700° F. to about 1000° F. In one preferred embodiment, the gaseous product mixture is prepared in an atmosphere which does not contain any of the nitrogen oxide containing gas which is to be purified. In this manner, the catalyst is not subjected to the poisoning effect of the combustion gases and can be utilized in the reaction of formaldehyde with nitrogen for extended periods of time. Accordingly, the method of the present invention which relates to the reduction of the nitrogen oxide content of combustion gases is essentially a selective, thermal, non-catalytic reduction process (SNR) which can be conducted at temperatures lower than the temperatures normally utilized in SNR processes.

Since the catalytic reaction of formaldehyde with nitrogen is conducted at elevated temperatures, various forms of formaldehyde and formaldehyde derivatives which are thermally decomposable to form formaldehyde at elevated temperatures can be utilized in the reaction. Thus, sources of formaldehyde useful in the method of the present invention include solutions of formaldehyde in water (e.g., 37% by weight solution in water), formaldehyde gas, or a formaldehyde derivative compound which decomposes and generates formaldehyde upon heating. Examples of such formaldehyde derivatives include paraformaldehyde, trioxane, etc. Throughout this specification and claims, the term formaldehyde includes formaldehyde in various forms and derivatives which decompose to form formaldehyde under the reaction conditions.

In one embodiment of the present invention, the formaldehyde utilized in the method of the invention is derived from methanol. Formaldehyde can be readily produced from methyl alcohol and air (oxygen) by techniques well known to those skilled in the art. For example, methanol can be oxidized to formaldehyde in the presence of various catalysts such as iron-molybdena (Fe Mo oxides) at temperatures of from about 550° F. to 750° F. As the formaldehyde is produced in the reaction, it can be stored or used immediately in the purification of the combustion gases by advancing the freshly prepared formaldehyde directly into contact with the combustion gases.

The catalysts which can be utilized to promote the reaction of formaldehyde with nitrogen may be any catalyst which promotes the reaction of formaldehyde with nitrogen. Examples of such catalysts include material comprising various metals such as vanadium, zirconium phosphorus, cerium, nickel, samarium, lanthanum, thulium or mixtures thereof. In one preferred embodiment, at least some of the vanadium, zirconium, cerium and/or phosphorus in the catalysts is present in the plus four oxidation state. Preferably the nickel and lanthanum are in the plus three oxidation state, thulium is in the plus two oxidation state, and samarium may be in the plus one or plus two oxidation states.

The oxides and sulfides of the above metals are examples of compounds found to be useful as catalysts. Zirconium, vanadium, cerium and phosphorus in the oxide and sulfide forms are examples of compounds which contain zirconium, vanadium cerium and phosphorus in the plus four oxidation state. A particular example of a zirconium compound containing zirconium in the plus four oxidation state is zirconium oxide, and a specific example of vanadium in the plus four oxidation state is $VO_2$ which may be present in small but sufficient quantity at certain crystal faces and discontinuities of $V_2O_5$. Vanadium and zirconium catalysts useful in the method of the present invention are commercially available, and they often contain at least some vanadium or zirconium in the plus four oxidation state along with other metals. For example, the catalysts useful in the method of the present invention may be commercially available mixed-metal oxide catalysts which contain at least some zirconium in the plus four oxidation state. Examples of unsupported powder catalysts include zirconium oxide and vanadium pentoxide powders from Aldrich Chemical Co. An example of a commercial supported zirconium-containing catalyst useful in the present invention is the zirconia catalyst ZR-0304T1/8 available from the Engelhard Corporation. An example of a commercial supported vanadium compound useful as a catalyst in the invention is the presulfated vanadium catalyst C116,3/16 available from United Catalysts, Inc.

The catalyst utilized in the method of the present invention may be formed in any conventional manner such as extrusion, tableting, pelleting, etc., or the active catalyst material can be supported on a carrier. The carrier is generally inert and may include silica, alumina, clay, alumina-silica, silicon carbide, zirconia, etc. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

The reaction between formaldehyde and nitrogen in the presence of the above-identified catalysts generally is conducted at temperatures between about 600° F. (315° C.) to about 1200° F. (650° C.). More generally, the reaction is conducted at temperatures of from about 600° F. to about 990° F. (530° C.). The formaldehyde and nitrogen can be mixed and thereafter heated to the desired temperatures, or the formaldehyde and nitrogen can be preheated and combined at the desired elevated temperature to effect the reaction.

Although applicants have discovered that the reaction product gas obtained when formaldehyde is reacted with nitrogen in the presence of the above-described catalysts is effective in reducing nitrogen oxide content of gas streams, analysis and evaluation of the mechanism of the reaction has not been completed and is not presently known with any certainty. Accordingly, applicants do not wish to be bound by any particular theory. The significant fact for the purpose of the present invention is that the reaction product gas obtained by the catalytic reaction of formaldehyde with nitrogen in accordance with the method of the present invention is effective in reducing the nitrogen oxide content of effluent gases at temperatures which are lower than the temperatures used in SNR processes. In some instances, the nitrogen oxide content of effluent gases can be reduced at very low temperatures including ambient temperature.

It has been suggested that formaldehyde and nitrogen react in the presence of a catalyst to form free radicals in accordance with the following reaction:

$$H_2CO + N_2 = NCO + NH_2.$$

The above postulated free radicals can then react with nitrogen oxide, and in particular, nitric oxide to form innocuous materials such as nitrogen, carbon dioxide and water in accordance with the following proposed reactions:

$$NO + NCO = N_2 + CO_2$$

$$NO + NH_2 = N_2 + H_2O.$$

As can be seen from the above reaction, one mole of formaldehyde should be effective in reacting with and removing two moles of nitric oxide from the gas stream resulting in the formation of water and carbon dioxide.

Accordingly, in a second embodiment, the present invention is a method of reducing the nitrogen oxide content of a gas stream utilizing the reaction product mixtures obtained by the reaction of formaldehyde with nitrogen in the presence of the above-described catalysts. The reaction product mixtures are particularly useful for treating gas streams containing nitrogen oxides such as combustion gases resulting from the combustion of fossil fuels in internal combustion engines, hydrocarbon fueled power plants, coal fired utility boilers in other similar installations.

This embodiment of the invention is illustrated in FIG. 1 which is a flow diagram illustrating the present invention for reducing the $NO_x$ content of combustion gases. Formaldehyde and nitrogen are fed to the first reaction zone 10 which contains a catalyst as described above which is capable of promoting the reaction between formaldehyde and nitrogen. The temperature within the first reaction zone is maintained at a temperature sufficient to effect the desired reaction but below about 1200° F. (650° C.). More often, the temperature within the first reaction zone 10 will be from about 600° F. (315° C.) to about 990° F. (530° C.), and in one embodiment, the temperature within the first reaction zone will be from 820° F. (437° C.) to about 960° F. (515° C.). The period of contact between the formaldehyde, nitrogen and catalyst contained in the first reaction zone 10 is dependent upon a variety of factors including the temperature of the gases within the reactor, the type and amount of catalyst, etc.

The reaction product mixture (gas) which is produced in the first reaction zone 10 is then advanced to the second reaction zone 12 where the reaction product mixture is brought into contact with the effluent gas containing $NO_x$. The second reaction zone may be a smokestack, a flue, a gas turbine exhaust, or the exhaust pipe from an internal combustion engine such as a diesel engine. The temperature within the second reaction zone may vary over a wide range and will be dependent in part upon the temperature of the effluent gas entering the second reaction zone. In general, the method of the present invention wherein the reaction product mixture described above is brought into contact with gases containing $NO_x$ may range from ambient temperature to about 2000° F. It is a particular advantage of the present invention that some of the reaction product mixtures obtained in accordance with the first embodiment of this invention are effective in reacting with and reducing the nitrogen oxide content of effluent gases at low temperature including about ambient temperature. In other embodiments, the reaction product gases produced in accordance with the first embodiment of this invention are brought into contact with effluent gases containing a nitrogen oxide at temperatures of from about ambient to about 1600° F., and within these temperature ranges, the present invention is effective in eliminating a large percentage of the nitric oxide present in the effluent gases. After the effluent gases have been treated in accordance with the method of the present invention in the second reaction zone 12, the gases can then be vented to the atmosphere or recovered if desired.

The amount of the reaction product mixture supplied to the second reaction zone (i.e., flue, smokestack or other exhaust device) can be varied in accordance with the amount of $NO_x$ in the gas and the desired objectives. Generally, the amount should be sufficient to react with the nitrogen oxides in the combustion gas based on the general assumption that one mole of formaldehyde can theoretically react with and remove two moles of NO from the gas.

The nitrogen oxide containing gas streams which can be treated in accordance with the method of the present invention may be derived from various mobile and stationary sources. Mobile sources include internal combustion engines such as buses, trucks and automobiles. Fixed or stationery sources of nitrogen oxide containing gases include stack gases from commercial and residential furnaces, kilns, residual oil and coal-fired utility boilers, industrial boilers, gas turbines, incinerators, diesel engine generators, etc.

The following examples illustrate the methods of the present invention. Unless otherwise indicated in the following examples and elsewhere in the specification and claims, all parts and percentages are by volume or mole, all temperatures are in degrees Fahrenheit, and all pressures are at or near atmospheric pressure.

EXAMPLES 1-5

These examples illustrate the method of the invention conducted under static conditions. The catalyst or catalyst mixture is charged to a 75 cc stainless steel reaction vessel, and formaldehyde, nitrogen and nitric oxide are then charged to the vessel in the molar ratios given in Table I. The supported zirconium catalyst is ZR-0304T1/8 from Engelhard. The reactor is heated to the desired temperature indicated in Table I, and then allowed to cool by removing the source of heat. After cooling, the product gas is removed from the reaction vessel and analyzed. The details of these examples are summarized in Table I. Control Example 1 is similar to Examples 4 and 5 except that no formaldehyde is added to the reactor and the $N_2$:NO molar ratio is 1:1.

gen at different $H_2CO$:NO ratios as shown in Table II. The temperature indicated in Table II is the temperature of the gas at the point of injection. The treated exhaust gas is sampled five feet downstream and analyzed with a Nova analyzer. Other details of these examples and the results obtained are also shown in Table II.

TABLE II

| Example | Temperature °F. | Stoichiometry $H_2CO$:NO | % No Reduction | % $O_2$ Before/After | % $CO_2$ Before/After | % CO Before/After | ppm HC Before/After | ppm NO Before/After |
|---|---|---|---|---|---|---|---|---|
| 6 A | 356 | 1.7 | 45.9 | 15.1/15.1 | 3.7/3.8 | 0.2/0.3 | 16/18 | 109/59 |
| 6 B | 358 | 5.8 | 81.9 | 15.2/15.1 | 3.9/4.0 | 0.3/0.4 | 8/34 | 116/21 |
| 6 C | 358 | 7.9 | 100.0 | 15.1/15.0 | 4.1/4.2 | 0.3/0.5 | 0/54 | 114/0 |
| 7 A | 832 | 1.2 | 6.6 | 4.7/4.7 | 8.8/8.8 | 0.1/0.1 | 13/13 | 242/226 |
| 7 B | 841 | 2.8 | 18.4 | 4.7/4.6 | 8.9/9.0 | 0.1/0.2 | 8/12 | 245/200 |
| 7 C | 847 | 4.5 | 31.5 | 4.6/4.6 | 9.2/9.2 | 0.1/0.2 | 3/26 | 279/191 |
| 7 D | 861 | 6.0 | 48.1 | 4.7/4.6 | 9.3/9.4 | 0.1/0.2 | 0/47 | 268/139 |
| 7 E | 860 | 8.8 | 77.8 | 4.6/4.6 | 9.5/9.5 | 0.1/0.3 | 0/111 | 248/55 |
| 8 A | 528 | 1.3 | 17.1 | 11.7/11.8 | 5.1/5.2 | 0.2/0.2 | 7/5 | 217/180 |
| 8 B | 528 | 1.3 | 24.8 | 11.8/11.8 | 5.4/5.5 | 0.2/0.3 | 0/0 | 218/164 |
| 8 C | 525 | 1.4 | 26.0 | 11.7/11.8 | 5.6/5.7 | 0.2/0.3 | 0/0 | 219/162 |
| 9 A | 518 | 0.7 | 13.8 | 11.3/11.3 | 5.3/5.4 | 0.1/0.2 | 20/18 | 188/162 |
| 9 B | 525 | 1.5 | 24.1 | 11.4/11.4 | 5.5/5.6 | 0.2/0.2 | 14/12 | 191/145 |
| 9 C | 526 | 1.3 | 23.8 | 11.4/11.4 | 5.7/5.7 | 0.2/0.2 | 7/6 | 214/163 |
| 10 A | 510 | 1.3 | 5.2 | 11.7/11.8 | 4.6/4.7 | 0.1/0.1 | 24/26 | 173/164 |
| 10 B | 525 | 2.8 | 22.8 | 11.6/11.6 | 4.7/4.7 | 0.1/0.1 | 24/26 | 193/149 |
| 10 C | 516 | 4.7 | 43.6 | 11.6/11.2 | 4.7/4.7 | 0.1/0.2 | 23/24 | 195/110 |
| 10 D | 516 | 6.5 | 66.0 | 11.7/11.6 | 4.7/4.8 | 0.1/0.2 | 20/24 | 188/64 |
| 11 A | 519 | 1.0 | 9.0 | 11.7/11.7 | 6.8/6.9 | 0.2/0.2 | ** | 189/172 |
| 11 B | 523 | 2.2 | 21.8 | 11.7/11.7 | 7.1/7.3 | 0.2/0.3 | ** | 197/154 |
| 11 C | 521 | 3.6 | 41.9 | 11.8/11.6 | 7.6/7.8 | 0.2/0.4 | ** | 203/118 |
| 11 D | 523 | 4.7 | 55.5 | 11.7/11.6 | 7.8/8.0 | 0.2/0.5 | ** | 210/94 |

**Hydrocarbon sensor not operating

As can be seen from the results of these examples the percent NO reduction increases at a given average temperature as the molar ratio of $H_2CO$:NO increases, and there is generally no significant increase in hydrocarbon content.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as are embraced within the scope of the appended claims.

We claim:

1. A method of converting formaldehyde to a gaseous product mixture capable of reacting with nitrogen oxide which comprises reacting formaldehyde with nitrogen in the presence of a catalyst capable of promoting the reaction at a temperature below about 1200° F.

2. The method of claim 1 wherein the reaction is conducted at a temperature of from about 600° F. to about 990° F.

TABLE I

| Example | Catalyst | (g) | Temp (°F.) | Molar Ratio $H_2CO$:$N_2$:NO | % NO Reduction | % No Reduction Adj. per Control-1 | $CO_2$ Final % | CO Final % |
|---|---|---|---|---|---|---|---|---|
| 1 | ** | | 822 | 1:1:1 | 99.0 | 98.8 | 31.580 | 2.936 |
| 2 | *** | | 822 | 1:2:2 | 98.0 | 97.6 | 34.088 | 4.901 |
| 3 | $V_2O_5$ | 1.0000 | 822 | 1:2:2 | 57.0 | 50.3 | 22.956 | 0.561 |
| 4 | $ZrO_2$ | 1.0001 | 820 | 1:2:2 | 98.8 | 98.5 | 32.416 | 0.059 |
| 5 | $ZrO_2$ | 1.0002 | 820 | 1:4:4 | 78.0 | 73.3 | 24.327 | 0.961 |
| Cont.-1 | $ZrO_2$ | 1.0001 | 820 | 0:1:1 | 12.4 | — | 5.474 | 0.536 |

*Supported $ZrO_2$ catalyst
**0.9993 $V_2O_5$, 0.5014 $ZrO_2$, 0.4992 $ZrO_2$*
***1.0011 $V_2O_5$, 0.5002 $ZrO_2$, 0.5515 $ZrO_2$*

EXAMPLES 6-11

A diesel exhaust gas obtained from a Cummins/Onan 4.0 DKC 60 Hz Diesel-Fuel Generator Set is used in these examples. The gas is passed through a flow tube and injected with a mixture of formaldehyde and nitro- 3. The method of claim 1 wherein the catalyst comprises vanadium, zirconium, cerium, phosphorus, or mixtures thereof.

4. The method of claim 1 wherein the catalyst comprises vanadium, zirconium or mixtures thereof.

5. The process of claim 1 wherein the catalyst comprises vanadium.

6. The method of claim 1 wherein the catalyst comprises vanadium and zirconium.

7. The method of claim 1 wherein the catalyst is zirconium.

8. A method for reducing the nitrogen oxide content of a gas stream comprising contacting the gas stream with an amount of a reaction product mixture obtained by reacting formaldehyde with nitrogen in the presence of a catalyst capable of promoting the reaction of formaldehyde with nitrogen at a temperature below about 1200° F., said amount being effective to reduce the nitrogen oxide content of the gas stream.

9. The method of claim 8 wherein the catalyst comprises vanadium, zirconium, cerium, phosphorus or mixtures thereof.

10. The method of claim 8 wherein the catalyst comprises vanadium, zirconium, or mixtures thereof.

11. The method of claim 8 wherein the catalyst comprises vanadium.

12. The method of claim 8 wherein the catalyst comprises vanadium and zirconium.

13. The method of claim 8 wherein the catalyst is zirconium.

14. The method of claim 8 wherein the formaldehyde and the nitrogen are reacted at a temperature of from about 600° F. to about 990° F.

15. The method of claim 8 wherein the formaldehyde is obtained from methanol.

16. The method of claim 8 wherein the reaction product mixture is contacted with the gas stream at a temperature of from about ambient to about 2000° F.

17. A method for reducing the nitrogen oxide content of a gas stream comprising the steps of
(A) reacting formaldehyde and nitrogen in a first reaction zone in the presence of a catalyst capable of promoting the reaction of formaldehyde with nitrogen at a temperature below about 1200° F. to form a reaction product mixture;
(B) advancing the product mixture from the first reaction zone to a second reaction zone containing a gas stream containing nitrogen oxide; and
(C) contacting the reaction product mixture with the gas stream in the second reaction zone for a period of time sufficient to reduce the nitrogen oxide content of the gas stream.

18. The method of claim 17 wherein the catalyst comprises vanadium, zirconium, cerium, phosphorus, or mixtures thereof.

19. The method of claim 17 wherein the catalyst comprises vanadium, zirconium, or mixtures thereof.

20. The method of claim 17 wherein the catalyst comprises zirconium.

21. The method of claim 17 wherein the catalyst used in (A) is zirconium oxide.

22. The method of claim 17 wherein the catalyst comprises vanadium and zirconium.

23. The method of claim 17 wherein the reaction of (A) is conducted at a temperature of from about 600° F. to about 990° F.

24. The method of claim 17 wherein the formaldehyde used in step (A) is obtained from the oxidation of methanol.

25. The method of claim 17 wherein the product mixture is contact with the gas stream in step (C) at a temperature from ambient to about 2000° F.

26. A method for reducing the nitrogen oxide content of a gas stream comprising the steps of
(A) reacting formaldehyde with nitrogen in a first reaction zone at a temperature of from about 820° F. to about 960° F. in the presence of a zirconium catalyst to form a reaction product mixture;
(B) advancing the reaction product mixture from the first reaction zone to a second reaction zone containing the gas stream; and
(C) contacting the reaction product mixture with the gas stream in the reaction zone at a temperature from ambient to about 2000° F. for a period of time sufficient to reduce the nitrogen content of the gas stream.

27. The method of claim 26 wherein the gas stream is an engine exhaust gas stream.

28. The method of claim 26 wherein the gas stream is a smokestack or boiler exhaust gas stream.

* * * * *